(12) United States Patent
Guenter et al.

(10) Patent No.: US 7,466,886 B2
(45) Date of Patent: Dec. 16, 2008

(54) COUPLING REGION FOR OPTICAL SYSTEMS

(75) Inventors: James Guenter, Garland, TX (US); Jack Gilkerson, Wylie, TX (US)

(73) Assignee: Finisar Corporation, Sunnyvale, CA (US)

( * ) Notice: Subject to any disclaimer, the term of this patent is extended or adjusted under 35 U.S.C. 154(b) by 210 days.

(21) Appl. No.: 11/178,170

(22) Filed: Jul. 8, 2005

(65) Prior Publication Data
US 2007/0009208 A1 Jan. 11, 2007

(51) Int. Cl.
*G02B 6/26* (2006.01)
(52) U.S. Cl. ................................. 385/52; 385/31
(58) Field of Classification Search ............ 385/52
See application file for complete search history.

(56) References Cited

U.S. PATENT DOCUMENTS

| | | | |
|---|---|---|---|
| 4,746,195 A | 5/1988 | Auracher et al. | |
| 4,854,667 A | 8/1989 | Ebata et al. | |
| 5,623,337 A * | 4/1997 | Iori et al. | 356/153 |
| 6,530,697 B1 | 3/2003 | Johnson et al. | |
| 6,690,865 B2 * | 2/2004 | Miyazaki | 385/52 |
| 2002/0081075 A1 | 6/2002 | Miyazaki | |
| 2002/0117604 A1 * | 8/2002 | Volk et al. | 250/201.9 |
| 2004/0051880 A1 | 3/2004 | Seko et al. | |
| 2004/0160998 A1 | 8/2004 | Gruhlke et al. | |

FOREIGN PATENT DOCUMENTS

JP 06259781 A 9/1994

* cited by examiner

*Primary Examiner*—Sung H Pak
(74) *Attorney, Agent, or Firm*—North Weber & Baugh LLP (57) ABSTRACT

The present invention discloses systems and methods for defining a coupling region or regions for use with optical systems. An embodiment of the coupling region represents a region in which an optical parameter meets or exceeds a selected threshold value. Embodiments of the coupling region may be used for the alignment, characterization, qualification, or design of optical elements or optical assemblies.

20 Claims, 11 Drawing Sheets

COUPLING REGION FOR OPTICAL SYSTEMS

CROSS-REFERENCE TO RELATED APPLICATIONS

The application is related to and incorporates by reference herein in its entirety commonly-assigned, U.S. patent application Ser. No. 11/157,564, entitled "POWER AND ENCIRCLED FLUX ALIGNMENT," filed on Jun. 21, 2005, which issued on Nov. 13, 2007 as U.S. Pat. No. 7,295,733.

BACKGROUND

1. Field of the Invention

The present invention relates generally to the field of optics, and more particularly to systems and methods for aligning, qualifying, or designing optical systems.

2. Background of the Invention

The alignment of optical elements, such as lens, detectors, emitters, optical subassemblies, lasers, light emitting diodes, and the like, is generally a very important aspect for optical systems or assemblies. Alignment is typically performed by aligning optical elements to the location where the highest power coupled or transmitted between the optical elements. Alignment is typically performed using automated systems having fixtures for holding one or more optical elements in known, fixed positions and a motor or motors attached to a stage or stages that move one or more optical elements relative to the fixed element. A stage may move the optical element in the x, y, and z directions while detectors monitor the output power. For example, an alignment system may include fixing the end of a fiber optic and moving an optical element, such as lasers, light emitting diode (LED), vertical cavity surface emitting lasers (VCSELs), lens, receivers, and optical fiber, while a video system and/or power meters monitors the power coupled into an optical element or into the fiber optic cable. Such systems generally align the elements to the point of peak coupled power, that is, the point of highest power transferred between the two optical elements.

However, this alignment approach may not produce the best alignment for a number of reasons. For example, depending upon the optics and the nature of the light source, the peak coupled power might occur at a position where the coupled power drops drastically from the peak power. Therefore, if a part in an assembly was aligned to the point of peak power, the assembly would have very limited tolerance to subsequent changes. These changes might occur when the assembly is exposed to mechanical forces, which might flex the part and change the effective alignment. Changes may also result from temperature changes, which may change the effective refractive index of optical components or the curvature of a lens and thereby change the focal point. Furthermore, aligning the parts to the peak coupled power may not necessarily result in the optimization of other performance characteristics that may be critical to assembly's utility. Therefore, it is important that the coupling occurs not only at the proper power levels but also at the proper location.

Furthermore, the quality of an optical element is generally checked by determining whether the optical element couples the correct power. However, as noted above, although the optical element may couple a sufficient level of power at one location, this point of peak coupled power may not be in the proper location, or it may have an unacceptable distribution.

Accordingly, there is a need for more robust alignment systems and methods for aligning, qualifying, or designing optical elements.

SUMMARY OF THE INVENTION

The present invention discloses systems and methods for defining a coupling region or regions for use with optical systems. An embodiment of the coupling region represents a region in which an optical parameter meets or exceeds a selected threshold value. Embodiments of the coupling region may be used for the alignment, characterization, qualification, or design of optical elements or optical assemblies.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. ("FIG.") 1 depicts a block diagram of an embodiment of a system for aligning optical components.

DETAILED DESCRIPTION OF THE INVENTION

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Figure 1:
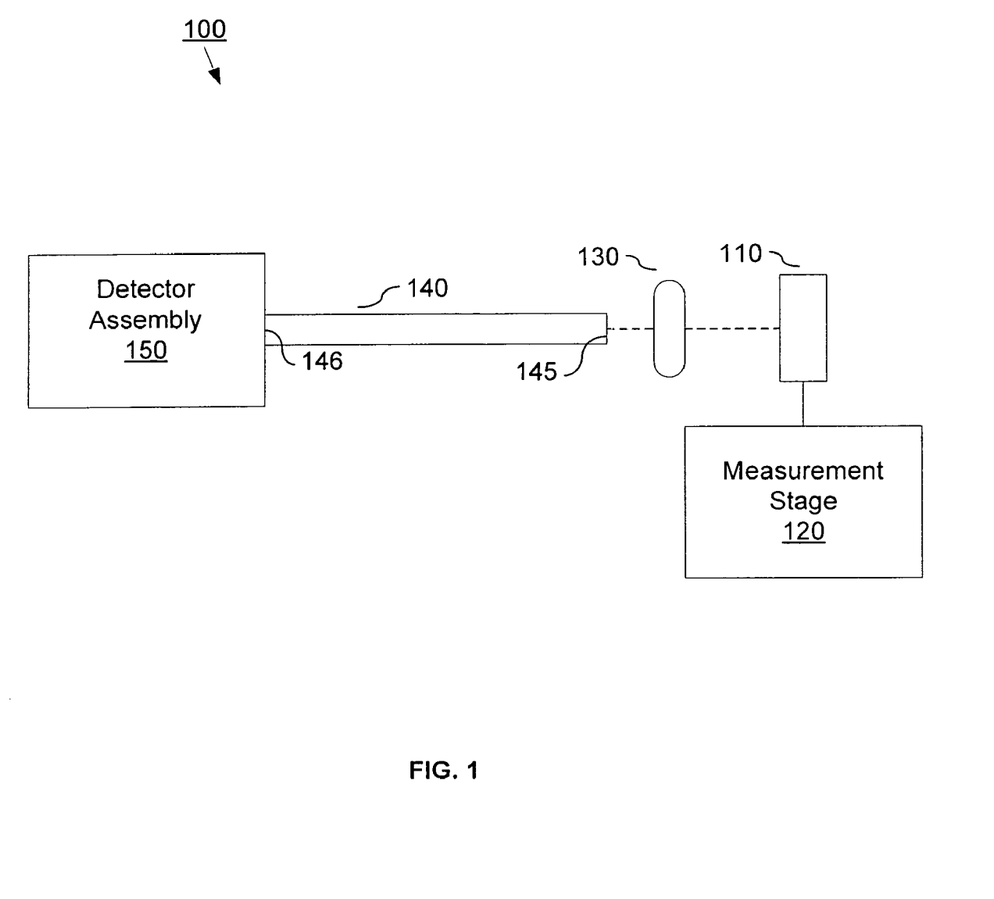
Figure 2:
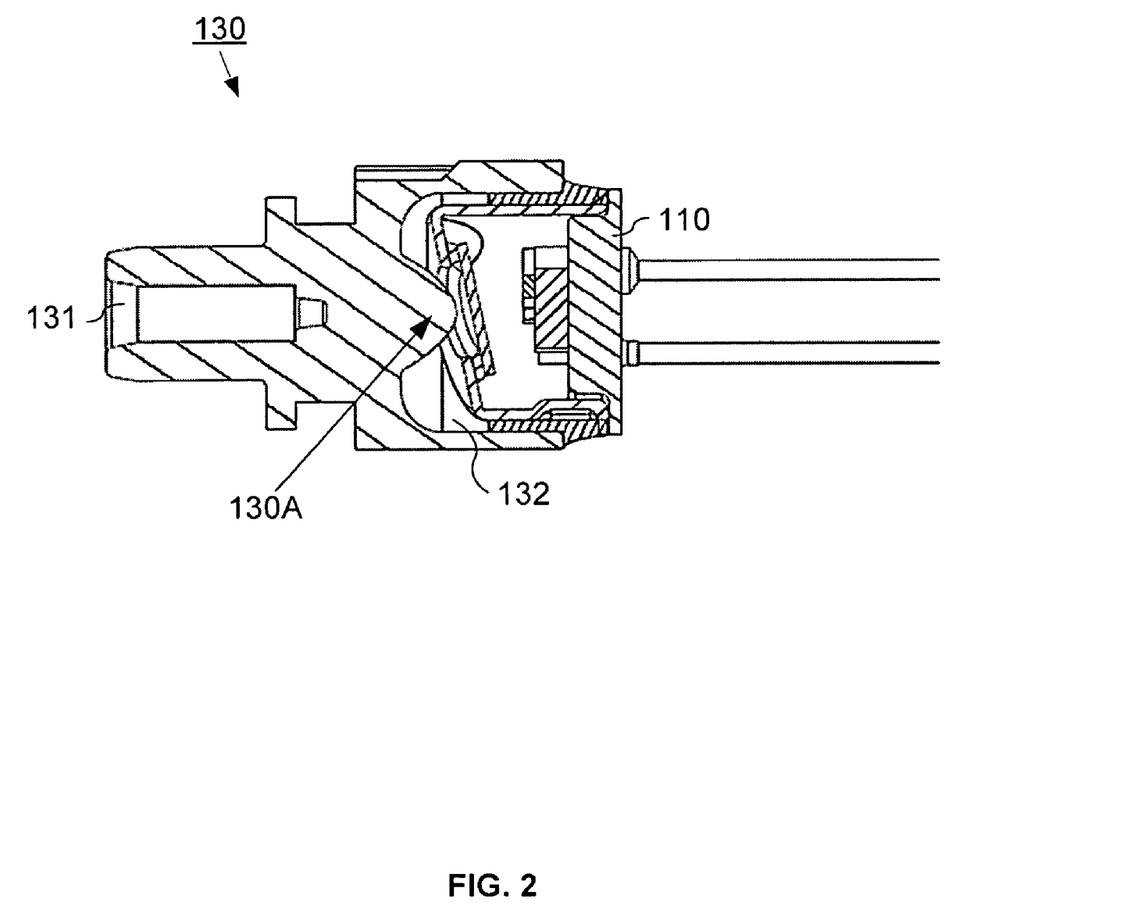
FIG. 2 illustrates an embodiment of an optical subassembly with an attached optical component.

FIG. 1 depicts a block diagram of a system 100 for characterizing or aligning optical elements. Depicted in FIG. 1 are lens barrel 130 or optical subassembly 130 and optical fiber 140, each of which may be secured in a fixture or fixtures (not shown). FIG. 2 illustrates an embodiment of an optical subassembly 130. Optical subassembly 130 possesses lens 130A, which may be an integral part of optical subassembly 130 or may be a separate part. Optical subassembly 130 also contains at its optical end a receptacle 131, or bore, to accept a fiber ferrule, and at its other end an opening 132 to receive an optical component 110. In the embodiment depicted in FIG. 2, the optical component 110 attached to the optical subassembly 130 is a vertical cavity surface emitting laser (VCSEL) housed in a standard TO can. It should be noted that the present invention is not limited to the use of VCSELs and that other subassemblies and optical components may be employed.

Returning to FIG. 1, optical component 110 is illustrated as being held by measurement stage 120, which may be an electrical and mechanical fixture capable of moving component 110 in a number of directions. Measurement stage 120 may be connected to a motor or a set of motors to move component 110, such as, for example, in the x, y and z directions, while detector assembly 150 monitors the light emitted at the distal end 146 of fiber 140. In an embodiment, measurement stage 120 is a part of an automated alignment system 100, which may incorporate hardware, software, firmware, or any combination thereof, that uses multiple scans to map the light coupled into fiber 140 as component 110 is moved in various positions.

In one embodiment, optical component 110 may be a transmitter, such as, for example, a laser, LED, or other emitter. The light emitted from component 110 passes through optical subassembly 130, into the fiber 140 at tip 145 and is received at detector assembly 150. One skilled in the art will recognize that optical component 110 may be a receiver component rather than a transmitter and that system 100 may be adapted for aligning or for characterizing such a component. For example, light may be emitted from fiber 140 and coupled into receiver 110. Detector assembly 150, or an additional detector assembly, may be configured to receive and monitor the light coupled into receiver component 110.

As noted above, the output of fiber 140 is provided to detector assembly 150 for measuring one or more parameters or characteristics of the light transmitted by fiber 140. To measure one or more optical parameters or characteristics, detector assembly may comprise a power meter, video camera, or other systems for measuring power, light distribution, or the like. Detector assembly 150 may also comprise software, hardware, firmware, or any combination thereof, for capturing, analyzing, or storing of the data associated with the measuring of the parameters or characteristics.

Figure 3:
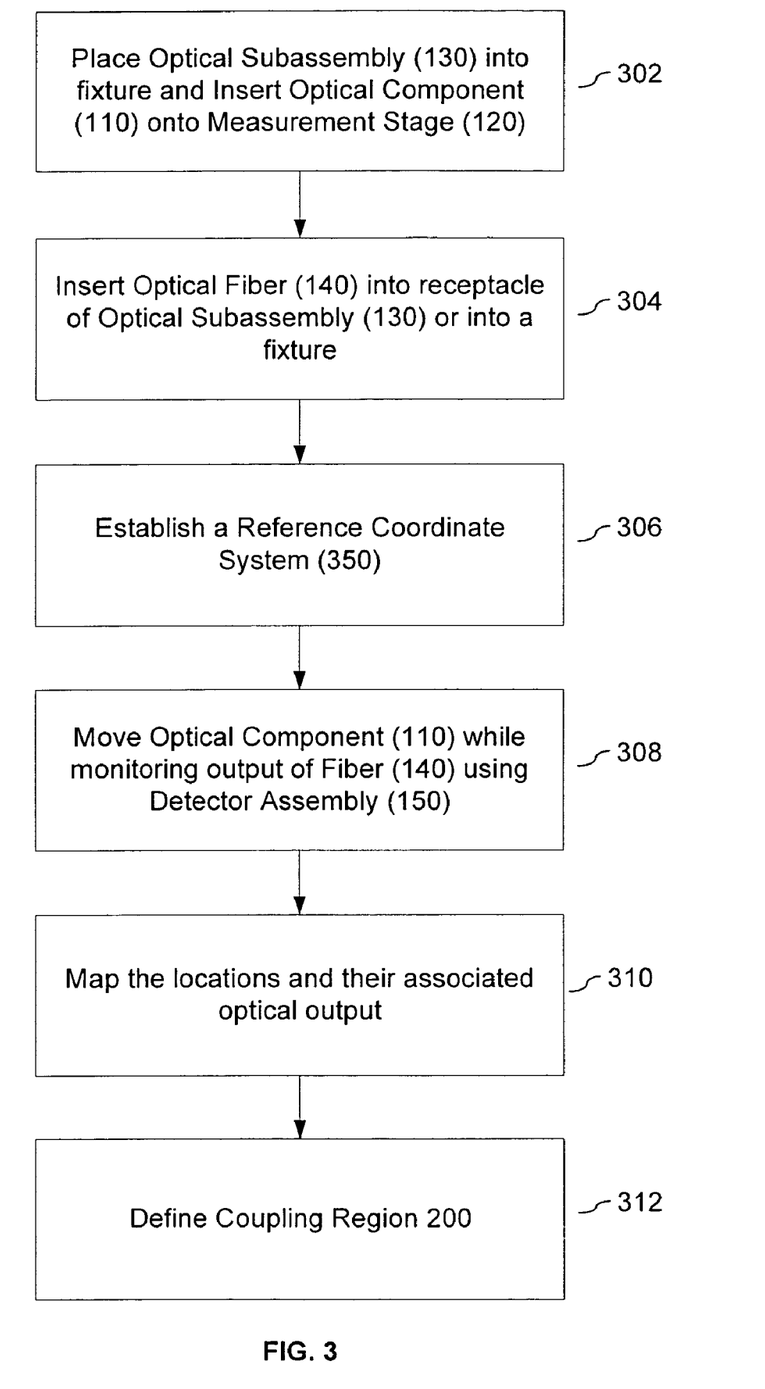
FIG. 3 illustrates a method for identifying a coupling region in accordance with an embodiment of the present invention.

FIG. 3 depicts an embodiment of a method for defining or identifying a coupling region or regions according to the present invention. Optical component 110 is placed 302 on measurement stage 120, and lens barrel or optical subassembly 130 is positioned 302 on a fixed and stable fixture. In one embodiment, end 145 of optical fiber 140 may be inserted 304 into receptacle 131 of optical subassembly 130; alternatively, optical fiber 140 may be held by a fixture or fixtures. With end 145 inserted 304 into receptacle 131 or positioned on a fixture, lens 130A is fixed in space relative to fiber 140.

Figure 4:
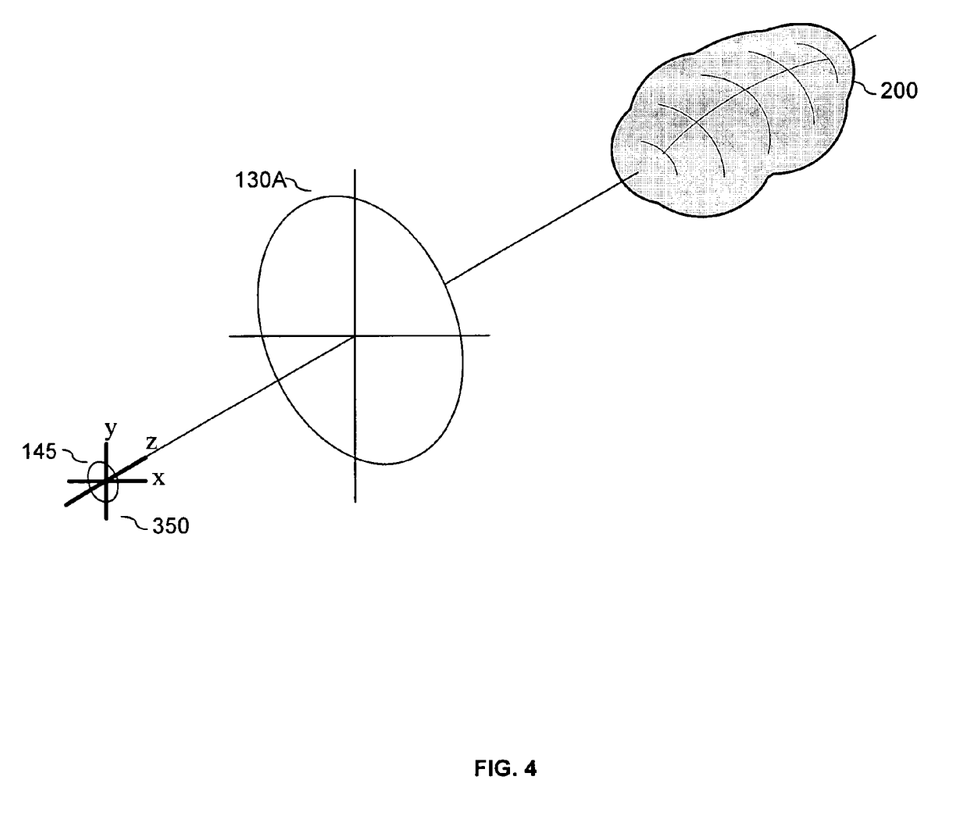
FIG. 4 illustrates an example of a coupling region in accordance with an embodiment of the present invention.

To resolve the locations through which optical component 110 will be moved, a reference coordinate system 305 may be established. As illustrated in FIG. 4, in one embodiment, coordinate system 350 has its origin at fiber tip 145, and the fiber ferrule, or its equivalent alignment features in embodiments without a ferrule, defines the z-axis. In an embodiment, a fixed and stable fixture may hold the fiber 140 and/or fiber ferrule that form the reference for the coordinate system. Alternatively, end 145 of optical fiber 140 may be inserted into receptacle 131 of optical subassembly 130, which is held in a fixed and stable fixture (not shown). In an embodiment, the component 110 axis is parallel to the fiber ferrule axis. With a reference coordinate system defined, an optical active region of the emitter or detector component 110 will have a known location relative to some mechanically verifiable feature, so that the position of that active region may be unambiguously resolved in the coordinate system.

Returning to FIG. 3, as measurement stage 120 moves component 110, typically in the x, y, and z directions, detector assembly 150 monitors 308 the output of the light coupled into fiber 140. Detector assembly 150 may measure one or more optical characteristics. In one embodiment, detector assembly 150 may measure coupled power; that is, the amount of power coupled into fiber 140 (assuming that optical component 110 is an emitter) when optical component 110 is at each of the known locations. In an alternative embodiment, detector assembly 150 may be configured to measure the encircled flux, as described in U.S. patent application Ser. No. 11/157,564, which issued on Nov. 13, 2007 as U.S. Pat. No. 7,295,733, entitled "Power and Encircled Flux Alignment," by James Tatum, James Guenter, and Jack Gilkerson, which is incorporated herein in its entirety. In one embodiment, detector assembly 150 includes an imaging system to make the encircled flux measurement. In an alternative embodiment, multiple measurements are made using different fibers in the alignment system 100, such as using 50 μm and 62.5 μm fibers and requiring $P_{50}$ and $P_{62.5}$ to be within some limits of one another. It should be noted that encircled flux data, which measures the distribution of the coupled power, may be used to calculate the coupled power, which represents the total coupled power. In an alternative embodiment, detector assembly 150 may be used to measure other optical characteristics, such as, tolerance to post-alignment stresses (mechanical or thermal stresses) or AC characteristics.

With a reference coordinate system 350 established on measuring system 100, precise and accurate location measurements of optical component 110 may be correlated with the resulting output characteristics of the light coupled into fiber 140. That is, the known locations of optical component 110 may be mapped 310 to one or more optical output characteristics. In one embodiment, all locations within a specified region are mapped to their correlated optical output. In an alternative embodiment, only locations that possess an optical characteristic at or above a specified threshold value are mapped; other locations, which may have been measured to determine if they meet the threshold value, may be disregarded. With a plurality of mapped locations, couple region 200 may be 312 defined.

In one embodiment, hardware, software, firmware, or any combination thereof, which may be part of system 100, may use any of a number of methods to define a region 200 identified by the locations. In one embodiment, coupling region 200 may be defined as the set of all locations in which the coupled power is at or above a threshold coupled power value. In an alternative embodiment, a set of locations, such as the outermost locations, may define the boundary of coupling region 200. Alternatively, mathematical models, including but not limited to, best fit models, may be used to define a region based upon the mapped region data.

In the event that more than one contiguous region is defined, such as for example, a bi-modal region, a coupling region may be selected based upon additional criterion or criteria. The additional criterion or criteria may include one or more of the following: selecting the region that contains the point of peak coupled power, selecting the region with highest average coupled power, selecting the region that will allow optical component 110 and subassembly 130 to be combined in view of the manufacturing tolerances, selecting the region with the best performance characteristic or characteristics, selecting the largest region, and the like.

Figure 5:
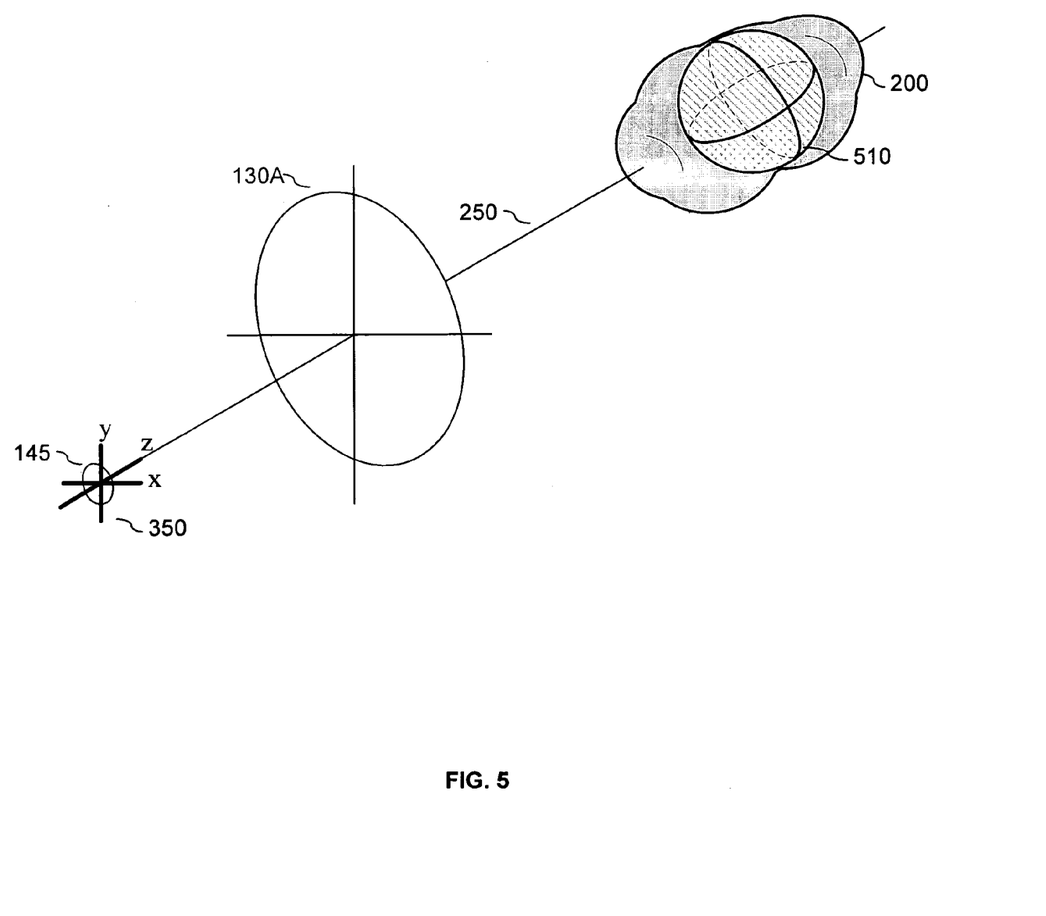
FIG. 5 illustrates an example of a coupling region in accordance with an embodiment of the present invention.

In another embodiment, one or more volumetric shapes, such as for example, spheres, ellipsoids, cones, paraboloids, and the like, may be used to define coupling region 200 by fitting the shape or shapes to the set of locations. In one embodiment, as depicted in FIG. 5, a set of know locations with coupled power values at or above the threshold coupled power value may be used to define a volumetric shape 510. In the embodiment depicted in FIG. 5, a sphere 510 is used to define the coupling region. In one embodiment, the set of know locations used to define the sphere may be a center location and a plurality of locations equidistant from the center location.

Figure 6:
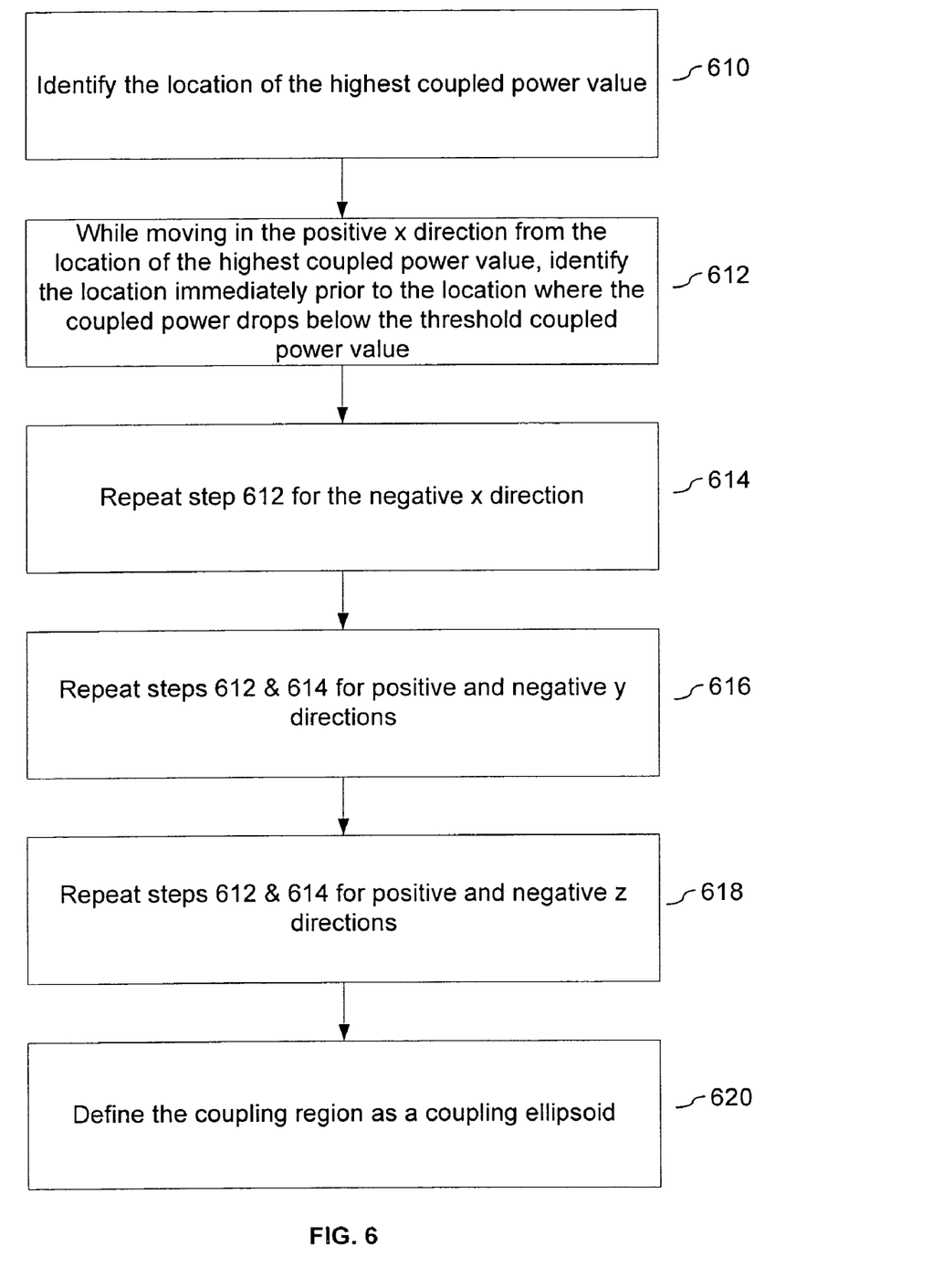
FIG. 6 illustrates a method for defining a coupling region as a coupling ellipsoid region in accordance with an embodiment of the present invention.

FIG. 6 depicts an alternative embodiment for defining a coupling region. The embodiment depicted in FIG. 6 assumes that steps 302-306 of FIG. 3 have been performed. While moving 308 optical component 110 through the active region, the location, referred to herein as the peak coupled power location, that correlates to the highest coupled power value is identified 610. Optical component 110 is moved from the peak coupled power location in the positive x direction to identified 612 the location immediately prior to the location where the coupled power value drops below the threshold coupled power value. Moving from the peak coupled power location in the negative x direction, a second location, which is the location immediately prior to the location where the coupled power value drops below the threshold coupled power value, is identified 614. The two locations identified in steps 612 and 614 form one of the axes of a coupling ellipsoid. Similarly, steps 612 and 614 are repeated for the y direction 616 and the z direction 618, wherein two additional axes of the coupling ellipsoid are identified. In an embodiment, coupling region 200 may be defined as a coupling ellipsoid with its centroid located at midpoints of the x, y, and z lines. The coupling ellipsoid may be used as a convenient approximation to the shape of the coupling region. It should be noted, however, that the actual coupling profile may not be symmetrically disposed about a centroid.

Figure 7:
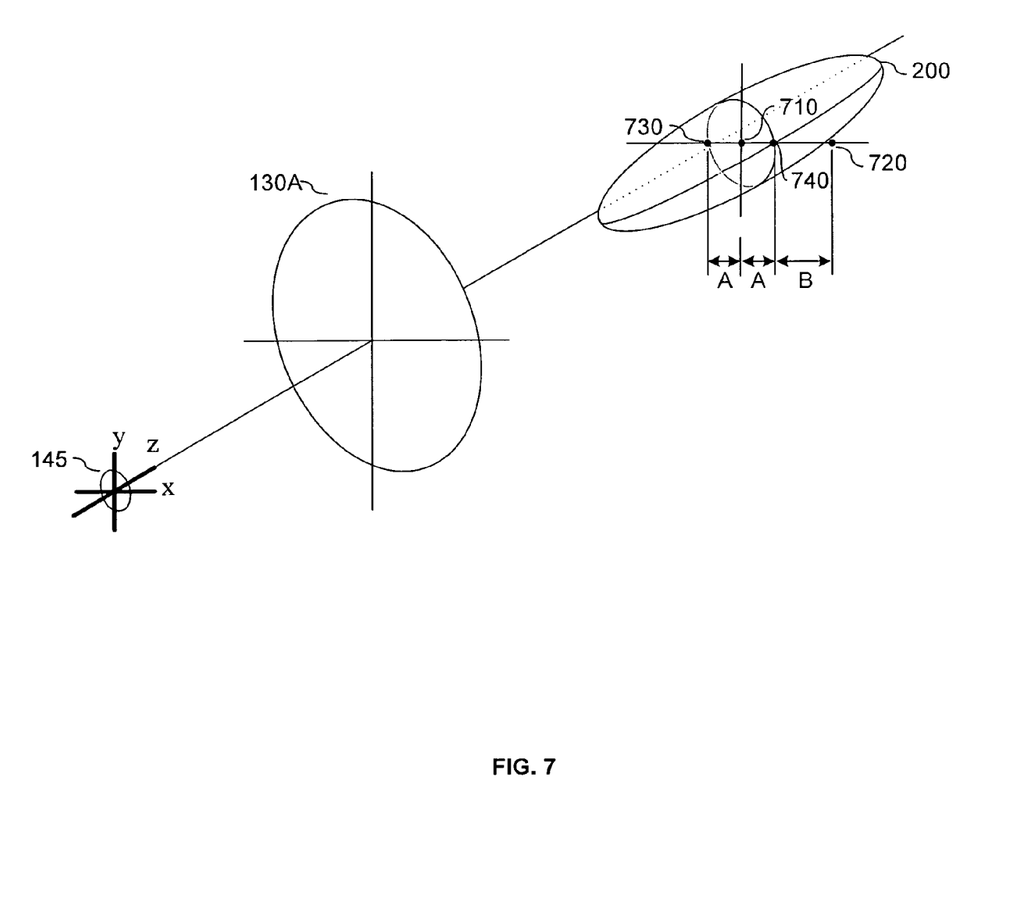
FIG. 7 illustrates a coupling ellipsoid region in accordance with an embodiment of the present invention.

In one embodiment, the locations on an axis are symmetrically disposed on either side of the peak coupled power location. FIG. 7 depicts an embodiment of an ellipsoid coupling region 200. As mentioned above, having located the peak coupled power location 710, the positive x location 720 (i.e., the location in the positive x direction immediately prior to the location where the coupled power value drops below the threshold coupled power value) and the negative x location 730 (i.e., the location in the negative x direction immediately prior to the location where the coupled power value drops below the threshold coupled power value) are identified. In the embodiment depicted in the FIG. 7, positive x location 720 is A+B units from the peak coupled power location 710 and negative x location 730 is A units from the peak coupled power location 710. In an embodiment, to ensure that coupling region 200 contains locations at or above the threshold coupled power value, the shorter of the two distances, A, may be set as the distance for both locations for the coupling region. Accordingly, location 740 which is A units from the peak coupled power location 710 is used to define one of the axes of ellipsoid coupling region 200. Locations for the y and z axes may similarly be obtained.

It should be noted that multiple coupling regions may be defined by selecting different threshold coupled power values. In one embodiment, multiple regions may be defined wherein different threshold values represents different percentages of the highest measure coupled power value.

Embodiments of the present invention may define a coupling region 200 that includes some points that do not exceed the threshold coupled power. In one embodiment, one or more criteria may be set to determine an acceptable limit of the number of locations that are below the threshold coupled power value. The criterion or criteria may include, but are not limited to, the method used to define region 200, the total number of locations within coupling region 220 that are below the threshold coupled power value, the percentage of locations within coupling region 220 that are below the threshold coupled power value, the position of the locations that are below the threshold coupled power value, the amount of clustering of locations that are below the threshold coupled power value, and how much below the threshold coupled power value each location is.

Figure 8:
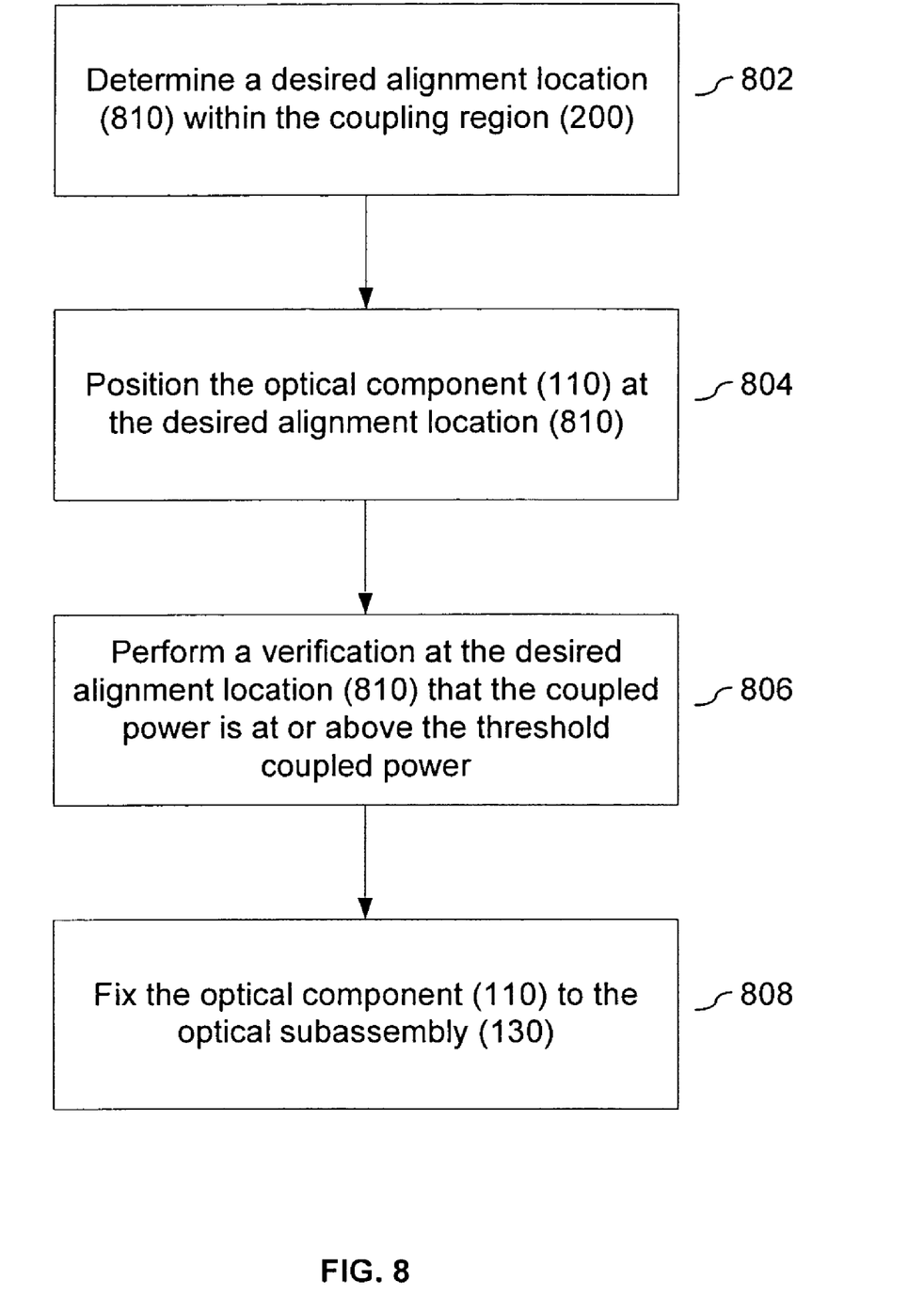
FIG. 8 illustrates a method for aligning and fixing an optical component into an assembly in accordance with an embodiment of the present invention.

Once a coupling region 200 has been defined, it may be used to align optical elements, such as the optical subassembly illustrated in FIG. 2. FIG. 8 illustrates the steps of an embodiment for aligning optical elements. Having established a coupling region 200, a desired alignment location 810 within coupling region 200 is identified 802. Desired location 810 may be selected in one or more ways. Desired alignment location 810 may be one in which the final assembly will result in the highest coupled power. Alternatively, desired alignment location 810 may be the location in which the final assembly will have a greater tolerance to post-alignment stresses. That is, as the part or assembly is exposed to mechanical forces, these forces may flex the part or assembly and change the effect of alignment. The forces may include changes in temperature, which can change the effective refractive index or curvature of the lens and move the focal point in and out, vibration, pressure, contact forces, and the like. Accordingly, desired alignment location 810 may be the center of coupling ellipsoid 200 in order to have the maximum tolerance of subsequent stresses.

In an alternative embodiment, desired location 810 may be a location related to performance criterion, some other parameter, or a combination of criteria or parameters. By mapping coupling region 200 and by knowing the nature of the optics or experimental results with similar assemblies, desired alignment location 810 may be a location that has a known relationship to a parameter or characteristic that may or may not be measured during the alignment process. In an embodiment, it may be known that the best encircled flux performance, instead of occurring at the location of peak coupled power or at the center of the coupling region 200, occurs at some other location within coupling region 200. Accordingly, desired alignment location 810 may be a location that has the best encircled flux performance rather than peak coupled power. Alternatively, desired alignment location 810 may be a location that produces the best AC performance.

In yet another embodiment, desired alignment location 810 may be a location within coupling region 200 that maximizes one or more parameters. For example, the encircled flux measurements, which may be one of the optical characteristics measured by system 100 as discussed earlier, benefits from the identification of coupling region 200 due to the correlation of the two characteristics. The encircled flux system, which looks at the distribution of power in the fiber, can also gain information about tolerance to wiggle or temperature variation due to correlation with coupling region 200. That is, during the encircled flux measurement, a camera may view the power distribution in fiber 140, and simultaneously gives the total power indication for determining a coupling region 200. A desired alignment location 810 may be one in which the encircled flux is at or above a specified value, the coupled power is above the threshold value (since it is within coupling region 200), and the part has sufficient tolerance to post-stress alignments. In an embodiment, the alignment parameters may include aligning related to tolerance to mechanical or thermal stresses, or to post-alignment shift (either deterministic, as can occur for instance as adhesives shrink on cure, or random, as can occur if parts are bumped or heated asymmetrically during cure). In an embodiment, the alignment parameters may include aligning for AC characteristics.

Having selected desired alignment location 810, optical component 110 is positioned 804 at that location. As an optional step, verification may be performed 806 at desired alignment location 810. That is, once optical component 110 is at desired alignment location 810, detector assembly 150 can verify 806 that one or more of the measured optical characteristics, such as coupled power, encircled flux, and the like, are at the expected and appropriate levels. If the verification result is performed and returns satisfactory results, optical component 110 may be fixed 808 into place.

One skilled in the art will recognize that in addition to aligning optical elements, the present invention may also be employed to design and qualify optical elements, such as optical lens. Generally, what is important for an optical assembly performance is that the proper amount of coupling occurs and that the coupling occurs at the proper locations. Therefore, if a part meets certain functional requirements, it will work in the intended application. To specify these functional requirements, a coupling region is employed.

Figure 9:
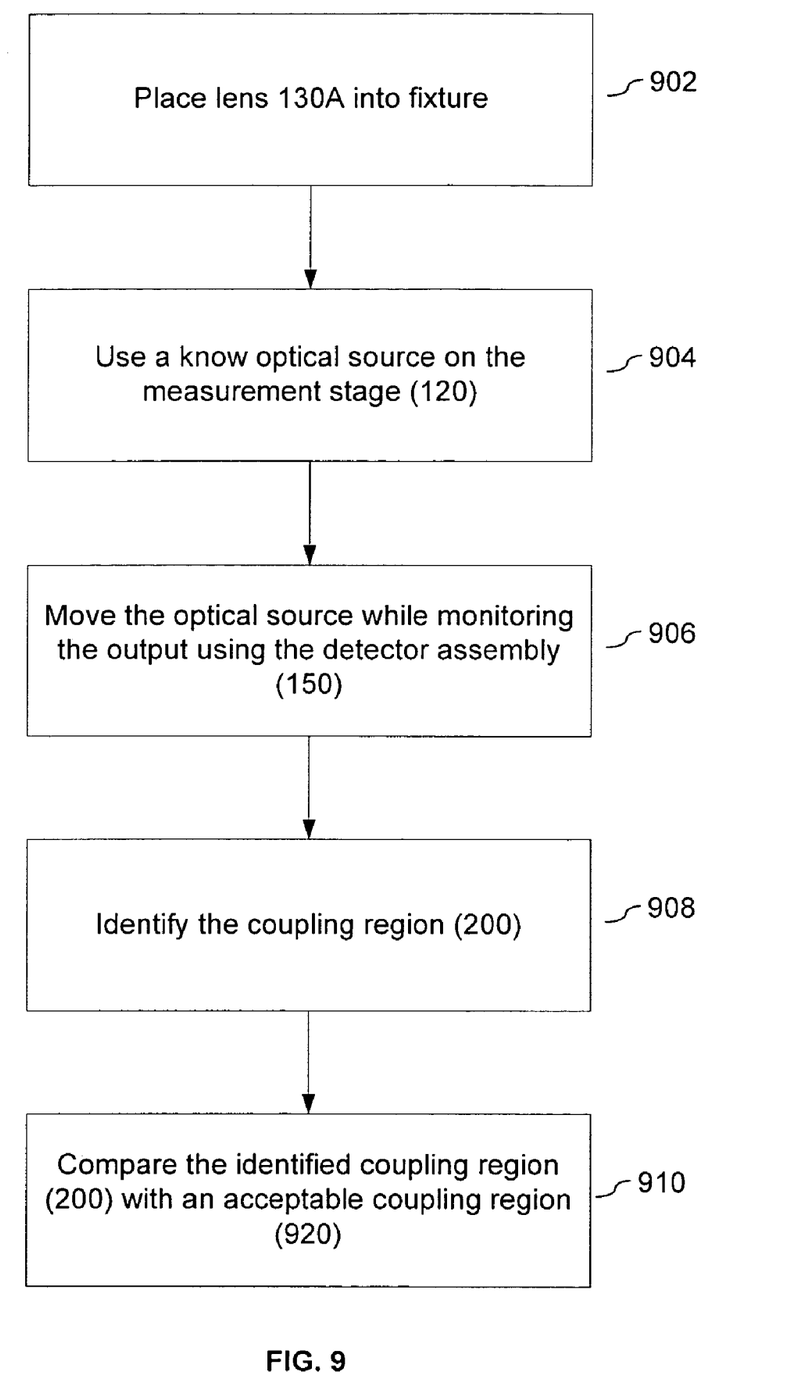
FIG. 9 illustrates a method for verifying an optical component by comparing its actual coupling region to an expected or acceptable coupling region in accordance with an embodiment of the present invention.

FIG. 9 depicts an embodiment of a method for verifying the quality of a lens 103A, which may be a separate lens or part of a lens barrel, optical subassembly, or assembly. Lens 130A is placed 902 into a fixture on measurement system 100. A known optical source is used 904 on measurement stage 120 to minimize the error attributed to lens 130A. The optical source is moved 906 while detector assembly 150 monitors the output. A coupling region is then identified 908 using one or more of the methods described previously.

Figure 10:
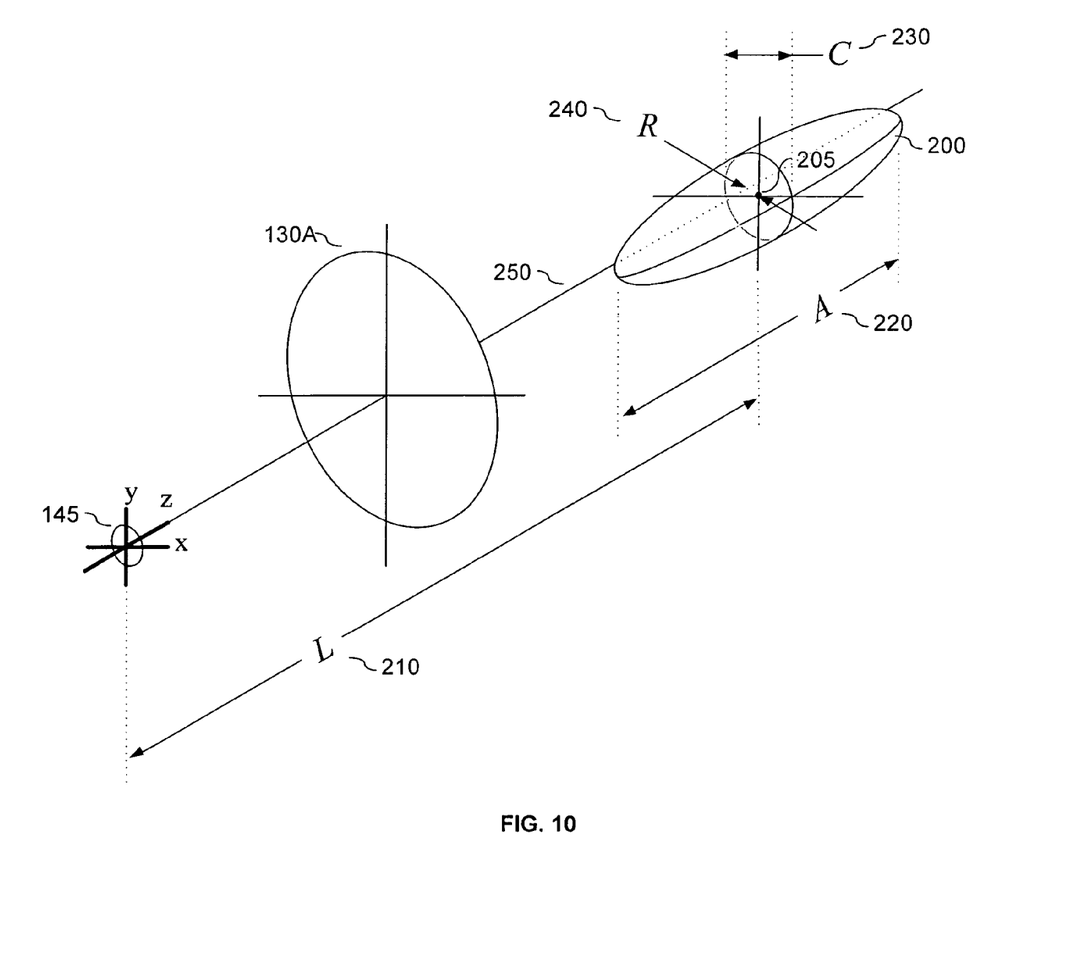
FIG. 10 illustrates an embodiment of a coupling region for qualifying, characterizing, or designing an optical system in accordance with an embodiment of the present invention.

The measured coupling region, 200 is then compared 910 against an acceptable coupling region 920. Given the optics design, acceptable coupling region 920 may be calculated or may be obtained from measurements made of parts that are known to yield acceptable performance results. FIG. 10 illustrates some characteristics which may be used to gauge the quality, which will be discussed in more detail below.

It should be noted that when verifying the quality of a lens or lens assembly, the optoelectronic components should preferably be from a correlated population, so that a damaged component may be replaced without significant changes in the coupling results. In an embodiment, a correlated population may be a group of several hundred parts assembled from a single region of a single wafer. In the case of VCSELs, the wafer may be chosen from the high-divergence end of the specification. The location of the active region within the component should be measured and referred to external mechanical features of the package so that the locations can be set when the component is installed into the alignment system. The flatness of the die relative to the rear mounting surface may also be verified. If the coupling region tolerances are loose, these measurements may be performed on a small sample of the correlated population. If the tolerances are tight, it may be necessary to measure each component individually.

Furthermore, it is preferable that the optical fibers have common characteristics, so that replacement of a damaged fiber does not significantly change coupling results. In an embodiment, the fiber characteristics are to single mode tolerances, even if they are multimode fibers.

Each optical element or subassembly may require a different type of optical component, or a different fiber. As a result, an embodiment of system 100 may include assemblies incorporating pre-aligned ferrules, pre-aligned subassemblies, or pre-aligned components as replaceable elements, rather than just fibers alone or optical elements alone. With appropriate kinematic mounting techniques, it may be possible to replace either a fiber assembly, a subassembly, or a component assembly without re-calibrating the alignment system. In an embodiment, verification is performed to ensure that the relationship between the coordinate system and the active region location is still accurately known.

FIG. 10 depicts an embodiment of a coupling region 200 and associated parameters or characteristics which may be used to qualify or characterize a lens 130A. First, the ratio of the peak or highest coupled power value to the total power from the source is one parameter. Termed "P," its value is always between zero and one. Typical minimum requirements for P are near 70%, but higher or lower values may be appropriate for some optics and applications. For example, in some cases the optical system may have attenuation to intentionally reduce power levels. Accordingly, it may be necessary to take into account the amount of power that is intentionally being attenuated by the lens. The attenuation information may be known in advance, or may be obtained by performing measurements.

In some embodiments, the measured value of P may be used to establish a coupling region, which coupling region helps define many of the remaining parameters that can be used to characterize an optical system. The boundary of a coupling region is generally those locations with coupled power values at or above a threshold coupled power value, which may be set as a fixed fraction of the peak coupled power.

The midpoint of the coupling region establishes a coupling centroid 205. The distance of this coupling centroid 205 from fiber tip 145 along the z-axis is defined as "L" 210. The radial distance coupling region 200 is from the z-axis is defined as "R" 240. Both of these parameters may be used to qualify or characterize a lens 130A.

The next two characteristics represent tolerance to misalignment. These two characteristics represent the cross-sectional distances of the coupling region in the x-y plane, "C" 230, and in the z-direction, "A" 220. In one embodiment, the total distances of A and C may be the only requirement. In alternative embodiments, additional restrictions may be appropriate. For example, in an embodiment, where significant asymmetry may be expected in the distances to the coupling region boundary measured in the positive and negative directions from the peak coupling location, either or both of A and C may be defined as sums of two distances—the distance from the centroid to the coupling region boundary in the positive direction and the distance from the centroid to the coupling region boundary in the negative direction. In one embodiment, the cross-sectional coupling contour in the x-y plane may be set to deviate no more that a specified amount from perfect circularity.

In an embodiment, the actual distribution of power in the coupling plane may be specified. Although different power distributions may generate the same coupling region, these power distributions may result in very different performance results. In an embodiment, the power distribution may be measured at the end of the coupling fiber 140, using the encircled flux measurements as mentioned above.

One skilled in the art will recognize that present invention may be used to design of optical system. The combination of the mechanically constrained exterior boundaries and the design and alignment process constrained coupling region size allow specification of L 210, R 240, A 220, and C 230. Because the characteristics discussed above are functional controls on whether it will be possible to couple an appropriate fraction of source power, and not individual controls on the multiple elements which could affect that coupling, their tolerances can be surprisingly loose. Instead of single micron tolerances on lens curvature, or perhaps ten micron tolerance on decenters, the location of the coupling region might have a tolerance of a hundred microns.

Figure 11:
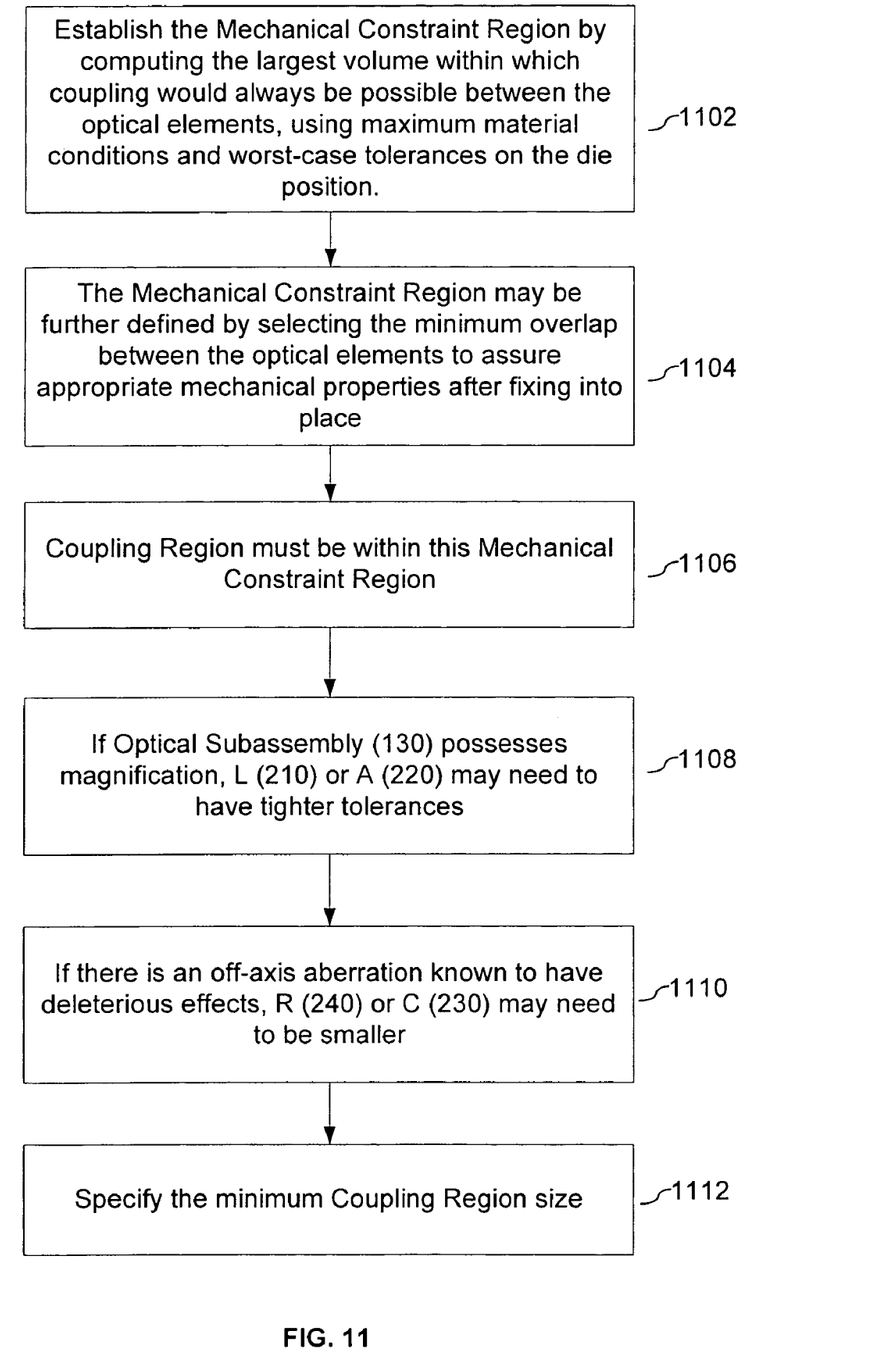
FIG. 11 illustrates a method for specifying the design or specifications of an optical system in accordance with an embodiment of the present invention.

Turning to FIG. 11, an embodiment for establishing these tolerances typically begins with the mechanical model of the intended assembly, and not with the optical model. Using maximum material condition and worst-case tolerances on die position, the largest volume within which coupling between the optical elements, such as for example, optical subassembly 130 and optical component 110, would always be possible without mechanical interference is calculated 1102. An additional constraint may be imposed by setting a required minimum overlap 1104 between the optical elements to assure appropriate mechanical properties after adhesive bonding or welding. In an embodiment, a minimum overlap on open side 132 of optical subassembly 130 is set to ensure that there is sufficient area to bond to optical component 110.

The volume computed thus far, the mechanical constraint region, is the maximum region that will guarantee that coupling could physically be achieved. Therefore, the coupling region should be designed to fall within the mechanical constraint region. Further constraints may also be imposed based on the optical model. If the optical system possesses magnification, L 210 and A 220 (as shown in FIG. 10) may require tighter limits 1108 or may allow broader tolerances. That is, if a magnification of X is present in the optic design, a change of one unit on one side of the optical system may result in X units changes on the other side. Thus, tolerance limits on L 210 and A 220 may be adjusted tighter or broader depending on which side of the lens the coupling region is defined.

Furthermore, if there is an off-axis aberration known to have seriously deleterious effects, R 240 or C 230 may need to be smaller 1110. In general, however, it should be possible to use the widest tolerances that mechanical constraints allow, and to control coupling characteristics with coupled power, P, and/or the power distribution. The coupled power, P, is typically not based on geometric requirements. As a pure coupling efficiency, its specification depends on power constraints imposed by the application, such as laser eye-safety limits or detector sensitivity requirements. Additional constraints may be imposed on P based on known problems with lower coupling, such as VCSEL mode selectivity effects or detector slow tails. The power distribution is usually based on application imposed constraints.

At this point, the boundaries of the coupling region that most closely approaches the mechanical and functional constraints have been established. Coupling region 200 should be contained within these boundaries.

In an embodiment, the design may include specifying 1112 the coupling region's minimum size, which controls the ease of alignment and the tolerance to post-alignment stresses. The "maximum minimum" coupling region size is based on the optical model. Typically, it is not reasonable to require a larger coupling region than the optical model says would be produced by a nominally-molded part. Molding errors may produce a coupling region that is smaller (or larger) than the optical model predicts, but this may still be well within alignment process tolerances. In general, the expected alignment tolerances should establish the actual minimum requirements for A 220 and C 230.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

We claim:

1. A method for defining a coupling region comprising the steps of:
    moving an optical element to a plurality of known locations;
    measuring an optical parameter value at each known location, of the plurality of known locations, to determine a coupled power value when the optical element is at each known location;
    selecting a threshold coupled power value; and
    defining a volumetric region wherein the boundary of said volumetric region is defined by a set of known locations, from the plurality of known locations, that possess or exceed the threshold coupled power value.

2. The method claim 1 wherein the optical parameter is encircled flux and the coupled power value is determined from the encircled flux measurement.

3. The method of claim 1 wherein the step of defining a volumetric region comprises the step of using the set of known locations to fit a geometric shape as the boundary.

4. The method of claim 3 wherein the step of using the set of known locations to fit a geometric shape as the boundary comprises the step of fitting the boundary to an ellipsoid.

5. The method of claim 4 wherein the step of fitting the boundary to an ellipsoid comprises the steps of:
    identifying a first know location, from the plurality of known locations, that corresponded to a first coupled power value;
    identifying a first set comprising two known locations collinear on a first line with the first known location, wherein the two known locations possess or exceed the threshold coupled power value and are separated by the first known location;
    identifying a second set comprising two known locations collinear with the first known location on a second line orthogonal to the first line, wherein the two known locations of the second set possess or exceed the threshold coupled power value and are separated by the first known location;

identifying a third set comprising two known locations collinear with the first known location on a third line orthogonal to both the first and second lines, wherein the two known locations of the third set possess the threshold coupled power value and are separated by the first known location;

fitting an ellipsoid to the first, second, and third sets of known locations, wherein the first, second, and third sets of known locations form the end points of the three axes of the ellipsoid.

6. The method of claim 5 wherein the first coupled power value is the highest coupled power value and the threshold coupled power value is a fixed fraction of the first coupled power value.

7. The method claim 1 further comprising the step of correlating a known location with at least one of the following parameters: encircled flux, AC performance, coupled power, tolerance to mechanical stresses, tolerance to thermal stresses, and tolerances to post-alignment shift.

8. A method for aligning a first optical element and a second optical element comprising the steps of:

moving the first optical element to a plurality of known locations;

measuring an optical parameter value at each known location, of the plurality of known locations, to determine a coupled power value when the optical element is at each known location;

selecting a threshold coupled power value;

defining a volumetric region wherein said volumetric region is bounded by a set of known locations, from the plurality of known locations, that possess or exceed the threshold coupled power value; and positioning the first optical element at an alignment location within the volumetric region.

9. The method of claim 8 further comprising the step of determining a desired alignment location within the volumetric region and wherein the step of positioning the first optical element at the alignment location within the volumetric region comprises positioning the first optical element at the desired alignment location.

10. The method of claim 9 wherein the step of determining a desired alignment location comprises selecting an alignment location based upon optimizing at least one of the following parameters: coupled power value, tolerance to mechanical stresses, tolerance to thermal stresses, tolerance to post-alignment stresses, encircled flux, and AC performance.

11. The method of claim 8 further comprising the step of fixing the first optical element at the alignment location.

12. The method of claim 11 further comprising the step of, prior to fixing the first optical element at the alignment location, verifying that the alignment location possesses or exceeds the threshold coupled power value.

13. A method for determining whether an optical element comprising a lens is acceptable for its intended function, the steps comprising:

establishing an acceptable volumetric coupling region;

identifying a volumetric coupling region of the optical element;

comparing the identified volumetric coupling region with the acceptable volumetric coupling region; and responsive to the identified volumetric coupling region being within specified limits of the acceptable volumetric coupling region, deeming the optical elements acceptable for its intended function.

14. The method of claim 13 wherein the step of identifying a volumetric coupling region of the optical element comprises the steps of:

positioning the optical element on a fixture;

moving an optical source to a plurality of known locations, wherein the optical source couples light into an input of the optical element;

measuring an optical parameter value of an output of the optical element when the optical source is at each known location, of the plurality of known locations, to determine a coupled power value when the optical source is at each known location;

selecting a threshold coupled power value; and defining the volumetric coupling region wherein the boundary of said volumetric coupling region is defined by a set of known locations, from the plurality of known locations, that possess or exceed the threshold coupled power value.

15. The method of claim 14 wherein the step of defining the volumetric coupling region comprises the step of using the set of known locations to fit the boundary as an ellipsoid.

16. The method of claim 13 wherein the step of establishing an acceptable volumetric coupling region comprises the step of identifying a volumetric coupling region of an acceptable part.

17. The method of claim 13 wherein the step of establishing an acceptable volumetric coupling region comprises the step of calculating a volumetric coupling region based upon an optical model of the optical element.

18. A method for designing an optical assembly comprising two optical elements, the method comprising the steps of:

establishing the mechanical constraint region by using maximum material conditions and worst-case tolerances on die position to compute the largest volume within which coupling between the two optical elements would always be possible without physical interference; and specifying a volumetric coupling region wherein the locations within the volumetric coupling region correlate to coupled power values that possess or exceed a threshold coupled power value and wherein the volumetric coupling region is contained within the mechanical constraint region.

19. The method of claim 18 further comprising the step of imposing a minimum overlap between the two optical elements to assure appropriate mechanical properties after the two optical elements have been adhered together.

20. The method of claim 18 further comprising the step of specifying a minimize size for the volumetric coupling region.

* * * * *